United States Patent [19]
Mott

[11] 4,125,809
[45] Nov. 14, 1978

[54] DIGITAL C/KT METER

[75] Inventor: Murray H. Mott, San Diego, Calif.

[73] Assignee: The United States of America as represented by the Secretary of the Navy, Washington, D.C.

[21] Appl. No.: 849,738

[22] Filed: Nov. 9, 1977

[51] Int. Cl.² .............................................. H04B 17/00
[52] U.S. Cl. ..................... 325/363; 325/67; 324/57 R
[58] Field of Search ............... 325/363, 364, 455, 466, 325/64, 65, 67, 31, 398; 330/2; 331/44, 64; 343/17.7; 329/111; 324/57 R, 57 N, 64

[56] References Cited

U.S. PATENT DOCUMENTS

| | | | |
|---|---|---|---|
| 3,351,853 | 11/1967 | Wood | 324/57 R |
| 3,463,934 | 8/1969 | Nobis | 324/57 R |
| 3,971,989 | 7/1976 | Singer et al. | 325/363 |
| 4,034,285 | 7/1977 | Ashley et al. | 324/57 R |

*Primary Examiner*—Robert L. Richardson
*Assistant Examiner*—Tommy P. Chin
*Attorney, Agent, or Firm*—R. S. Sciascia; G. J. Rubens; T. M. Phillips

[57] ABSTRACT

A digital C/kT meter for measuring the ratio of carrier power to noise power in a one Hz bandwidth and provide the results to a continuous read-out digital display. The circuit receives an input signal from the i-f amplifier prior to demodulation. The signal is amplified and fed to a mixer where it is converted down to a lower frequency. The mixer supplies the signal to a power divider through a voltage controlled attenuator where the signal is split into a noise power channel and a carrier power channel. The noise signal is filtered, amplified and fed to a detector/amplifier. The output of the detector/amplifier is integrated and fed back to the voltage controlled attenuator to form an automatic gain control feedback loop such that the noise power level output of the bandpass filter and amplifier is held constant. The carrier power is measured in the carrier channel similar to that of the noise channel except that the voltage controlled attenuator is in the carrier channel only. A resistor is connected in series in the feedback circuit to the carrier attenuator. The result is that the log of the voltage drop across the resistor is directly proportional to the ratio of carrier power to noise power and is employed to actuate a digital display.

9 Claims, 3 Drawing Figures

DIGITAL C/KT METER

BACKGROUND OF THE INVENTION

Presently existing satellite communication terminals do not include any suitable means for measuring the ratio of carrier power to noise power in a one Hz bandwidth. The larger satellite communication terminals make use of expensive complex spectrum analyzers for making this measurement.

SUMMARY OF THE INVENTION

The present invention provides for a digital C/kT meter for measuring the ratio of carrier power to noise power in a one Hz bandwidth of the Earth Coverage Beacon Signal and for displaying the results on a continuous reading digital display at a satellite communication terminal. The i-f signal from the receiver is amplified and mixed to provide a convenient frequency and is fed to a voltage controlled attenuator and then fed to a power divider where the signal is split in half and fed to two separate channels: a noise channel and a carrier channel. The noise measurement channel consist of a bandpass filter, amplifier/detector and integrator. The detected noise output from the integrator is fed back to control the variable attenuator. A dc reference voltage is applied to the integrator input such that the noise power level output is held constant. The second or carrier channel consists of bandpass filters, amplifiers, a detector, and an integrator. The circuit functions similar to the AGC loop of the noise channel except that the feedback voltage controlling the variable attenuator is fed through a resistor. As a result the log of the voltage drop across the resistor is directly proportional to the attenuation, in dB, of the attenuator of the carrier signal channel attenuator. Since the noise signal channel AGC loop attenuator is set for a constant noise level, the carrier channel attenuator setting is a direct measure of the C/kT. In order for the meter to read directly in dB, the voltage drop across the carrier channel resistor is fed to a differential amplifier, the output of which is amplified in a log amplifier which provides an output which is fed through a display driver amplifier. The driver amplifier drives a digital panel meter (DPM) which is a digital volt meter that reads C/kT directly in dB. The use of separate references allows the user to select different types of carrier modulation depending on the signal characteristics. A provision is made so that the DPM is blanked off automatically when noise signals or carrier signals input levels are to low for reliable measurement to be made. It is to be understood that the term C/kT as used herein is defined as the ratio of carrier power to noise power in a one Hz bandwidth.

OBJECTS OF THE INVENTION

An object of the invention is the provision of a digital C/kT meter for measuring the ratio of carrier power to noise power in a one Hz bandwidth and provide the result to a continuous reading digital display.

Other objects and many of the attendant advantages of this invention will be readily appreciated as the same becomes better understood by reference to the following detailed description when considered in connection with the accompanying drawings.

Figure 1:
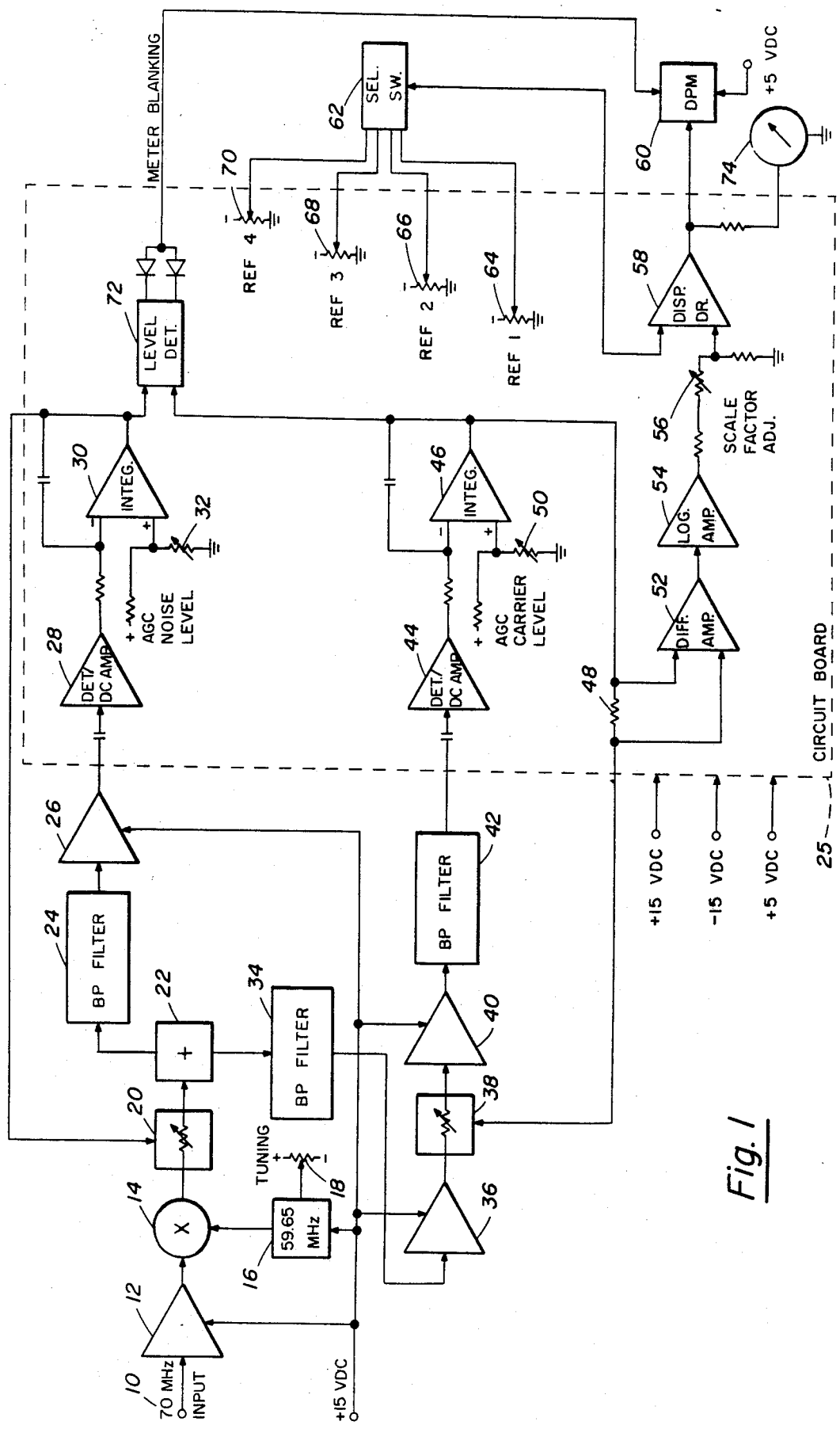
FIG. 1 is a block diagram of the preferred embodiment of the invention.

Referring now to the block diagram of FIG. 1, an input signal is connected to input terminal 10, usually from the i-f amplifier of a beacon signal receiver (70 MHz). The input signal is amplified in amplifier 12 and fed to mixer 14 where it is mixed with a 59.65 MHz signal from voltage controlled crystal oscillator 16 and converted down to 10.35 MHz. Fine tuning of oscillator 16 is accomplished by means of the variable resistor 18. The output from mixer 14 is fed through voltage controlled attenuator 20 to power divider 22 where the signal is split in half. Each half is fed to two separate channels; a noise measurement channel and a carrier measurement channel. The noise measurement channel consist of bandpass filter 24, amplifier 26, detector/amplifier 28 and integrator 30. The detected noise output of detector/amplifier 28 is fed to integrator 30 whose output is fed back to voltage controlled attenuator 20. By applying a reference voltage that is adjustable to the positive input terminal of integrator 30, an automatic gain control feedback loop is established. Adjustment of resistor 32 sets the dc reference voltage and any difference between the output of noise detector 28 and the reference voltage is amplified and used to control attenuator 20 such that the noise power level output of amplifier 26 is held constant.

The carrier power measurement channel consists of bandpass filter 34, amplifier 36, voltage controlled attenuator 38, amplifier 40, bandpass filter 42, detector/amplifier 44, and integrator circuit 46. Bandpass filters 34 and 42 provide a narrow bandwidth (e.g. 500 Hz) to allow the carrier signal to be amplified and provide some noise rejection. The carrier signal is detected in detector/amplifier 44 and fed to integrator 46. The operation is similar to the automatic gain control loop described above for the noise channel except that the output signal from integrator 46 is fed through a resistor 48 to voltage controlled attenuator 38. An variable reference voltage is also applied to the positive input terminal of integrator 46 and the level of which is controlled by means of variable resistor 50. Since the noise automatic gain control loops sets attenuator 20 for a constant noise level, the log of the voltage drop across resistor 48 is directly proportional to C/kT. The voltage drop across resistor 48 is fed to differential amplifier 52 the output of which is fed to log amplifier 54. The output from log amplifier 54 is fed through a variable resistor 56, amplified in display driver amplifier 58 and fed to DPM 60. The scale factor is controlled by resistor 56 and the dc reference for DPM 60 may be selected by means of selector switch 62. Four positions for selector switch 62 are shown: position 1, resistor 64; position 2, resistor 66; position 3, resistor 68; position 4, resistor 70. The use of separate references, allows the user to select different types of carrier modulation depending on the signal characteristic.

A voltage level detector 72 senses the voltage level of each channel and as a result, the DPM 60 is blanked off automatically when noise or carrier input levels are too low for reliable measurements to be made. Meter 74 is used for tuning voltage controlled oscillator 16 and provides an approximate analog C/kT read-out. The negative input terminal of display driver amplifier 58 is connected to the switching arm terminal of selector switch 62.

Referring now to FIG. 2 wherein there is shown in schematic diagram form the circuit board 25 of FIG. 2. The reference numbers referring to the same elements throughout the several figures. Detector/amplifiers 28 and 44 are operational amplifiers 74 and 76, respectively, configured as a detector and dc amplifier. Integrators 30 and 46 are operational amplifiers 78 and 80, respectively, configured as integrating circuits. The output from integrator 46 is fed through resistor 48 to variable attenuator 38 (FIG. 1). The voltage drop across resistor 48 is fed to operational amplifier 82 configured as a differential amplifier circuit 52. The output from differential amplifier circuit 52 is fed to the negative input of operational amplifier 84. Which is the input to a logarithmic amplifier 54 which consists of operational amplifiers 84, 86 connected as shown to provide an output signal that is proportional to the C/kT. The output signal from log amplifier 54 is fed through variable resistor 56 as the positive input to operational amplifier 88 configured to operate as a driver amplifier 58 for DPM 60. Four reference voltages are set up by variable resistors 64, 66, 68, and 70 connected to the negative 15 volt supply.

The output signals from integrator circuit 30 and integrator circuit 46 are fed to a level detector circuit which consist of zener diodes 90 and 92 and a TTL hex inverter chip 94 the output of which provides a blanking signal to automatically blank DPM 60 when noise or carrier input levels are to low for reliable measurements to be made.

Figure 2A:
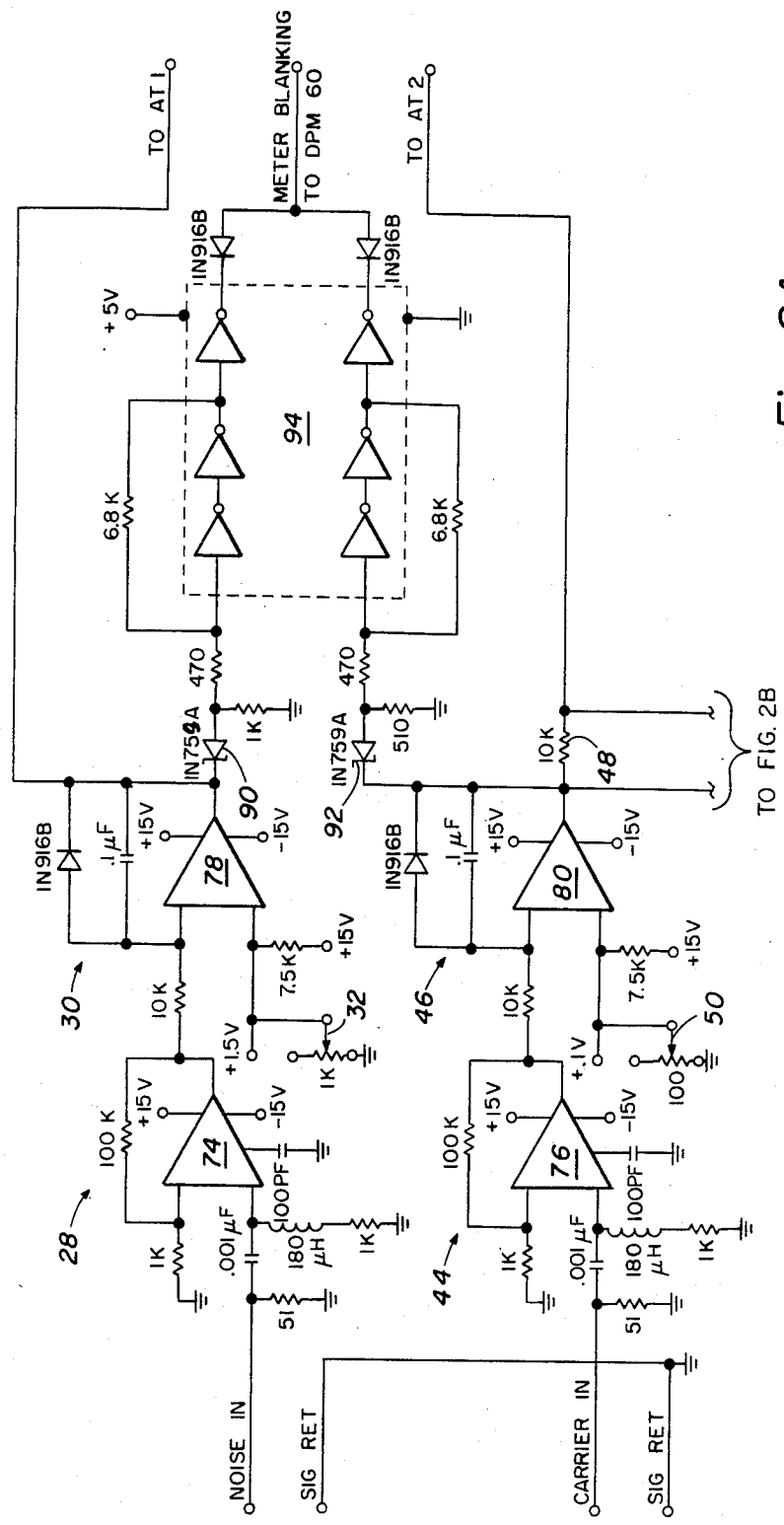
FIGS. 2A and 2B are a schematic diagram of the circuit board of FIG. 1.
Figure 2B:
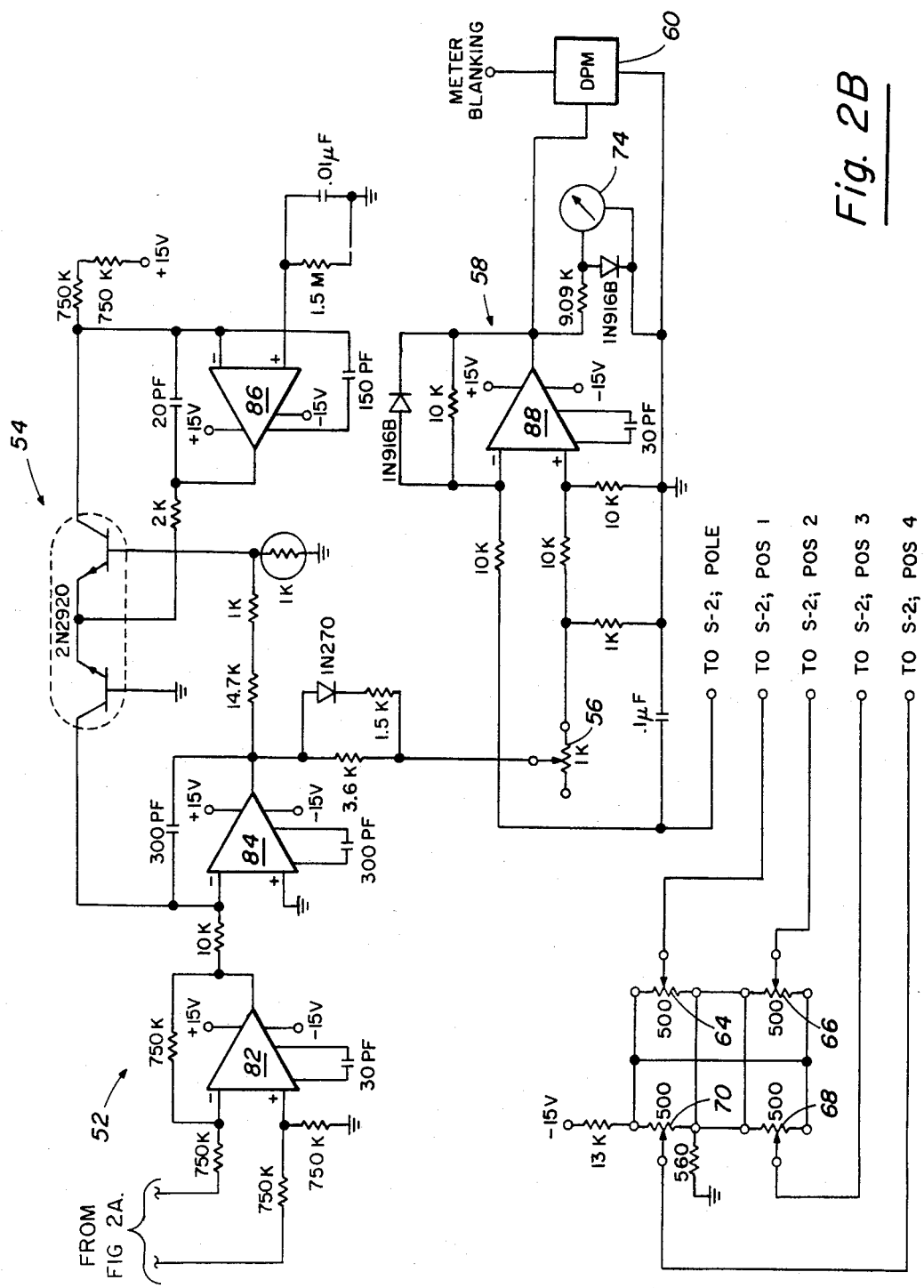

The values shown on the schematic diagram of FIGS. 2A and 2B have been found satisfactory in implementing the invention operating with the input frequency as shown in FIG. 1. Operational amplifiers 74, 76, and 82, 84 are dual operational amplifiers of the type, LH2308D. Operational amplifiers 78, 80 is a dual operational amplifier of the type, $\mu$A747C. Operational amplifiers 86, 88 is a dual operational amplifier of the type, LH 2301AD. TTL hex inverter 94 is of the type, SN7404N.

In operation, initial tuning is by adjusting potentiometer 18 for maximum deflection of meter 74. The circuit will now automatically provide a continuous digital read out by DPM 60 of the ratio of carrier power to noise power in a one Hz bandwidth.

Obviously many other modifications and variations of the present invention are possible in the light of the above teachings. It is therefore to be understood that within the scope of the appended claims the invention may be practiced otherwise than as specifically described.

What is claimed is:

1. A digital C/kT meter for measuring the ratio of carrier power to noise power in a one Hz bandwidth comprising:
   (a) input means for receiving electromagnetic energy signals received from a satellite beacon,
   (b) first variable attenuating means coupled to said input means,
   (c) power divider means coupled to said first variable attenuating means dividing the input signal into two output signals,
   (d) a noise measurement channel connected to one output of said power divider for measuring the noise level of the input signal and providing an automatic gain control signal for controlling said first variable attenuating means to maintain a constant noise level signal at the output of said first variable attenuating means,
   (e) a carrier measurement channel connected to the other output of said power divider for measuring the carrier level, said carrier measurement channel including a second variable attenuating means and providing an automatic gain control signal for controlling said second variable attenuating means to maintain a constant carrier level at the output of said second variable attenuating means and
   (f) circuit means connected to said carrier measurment channel and being responsive to the automatic control gain signal of said carrier measurement channel to provide an output signal proportional to C/kT.

2. The meter of claim 1 wherein said second variable attenuating means is a voltage controlled attenuator.

3. The meter of claim 2 wherein said carrier measurement channel includes detector circuit means coupled to the output of said second variable attenuating means, an integrating circuit connected to the output of said detector circuit means for providing an output voltage, and a resistor connected in circuit between the output of said integrating circuit and said voltage controlled attenuator.

4. The meter of claim 3 wherein said circuit means includes a logarithmic amplifier, the input of which is proportional to the voltage drop across said resistor.

5. The meter of claim 4 wherein the output of said logarithmic amplifier is coupled to a digital voltmeter.

6. The meter of claim 5 and further comprising voltage sensing circuit means coupled to the outputs of said noise and carrier channels whereby said digital voltmeter is blanked off automatically when the noise or carrier input levels are below a predetermined level.

7. The meter of claim 5 and further comprising selectable reference voltage means for said digital voltmeter whereby the user may select different types of carrier modulation depending on the input signal characteristics.

8. The meter of claim 5 wherein said noise channel includes a bandpass filter having an input connected to one of the outputs of said power divider and having an output, a detector/amplifier coupled to the output of said bandpass filter and having an output, an integrator circuit having a first input connected to the output of said detector/amplifier, and a second input connected to an adjustable voltage source and having an output, the output of said integrator circuit being connected to said first variable attenuating for maintaining the noise power level in said noise and said carrier channels constant.

9. The meter of claim 8 wherein said detector/amplifier within said carrier channel has an input coupled to the output of said second variable attenuating means and having an output, said integrator circuit having a first input connected to the output of said detector/amplifier and a second input connected to an adjustable voltage source and having an output, the output of said integrator circuit being connected to said second variable attenuating means for maintaining the carrier power level in said carrier channel constant whereby a constant signal power level is fed to said detectors eliminating the need for wide dynamic range detectors.

* * * * *